April 20, 1965 A. H. SHAPIRO 3,179,945

MAGNETIC DISC STORAGE DEVICE

Filed March 21, 1961

INVENTOR.
Ascher H. Shapiro
BY
Philip J. McFarland
Attorneys

United States Patent Office 3,179,945
Patented Apr. 20, 1965

3,179,945
MAGNETIC DISC STORAGE DEVICE

Ascher H. Shapiro, Arlington, Mass., assignor to Laboratory for Electronics, Inc., Boston, Mass., a corporation of Delaware Filed Mar. 21 1961, Ser. No. 97,304
7 Claims. (Cl. 346—74)

Figure 1:
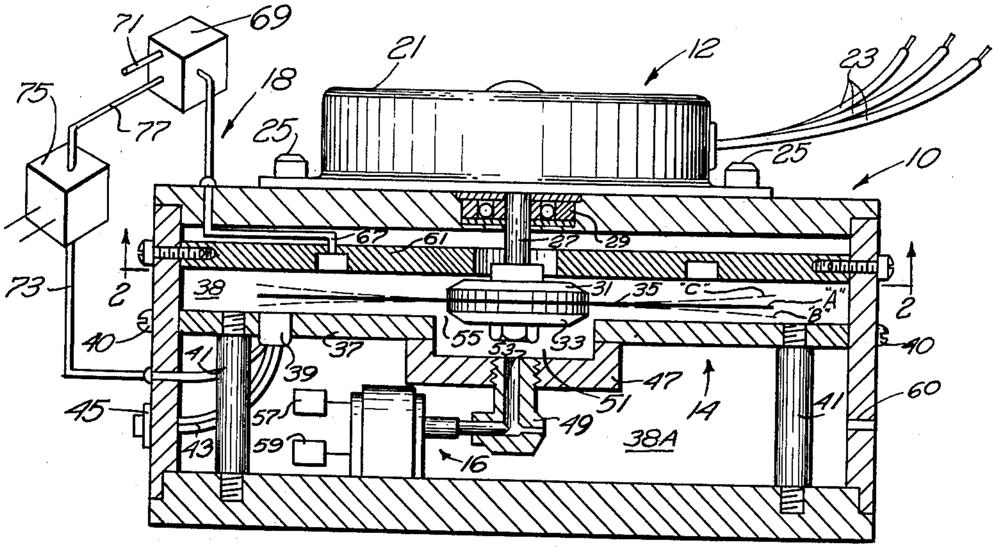

This invention relates generally to data processing apparatus and particularly to a magnetic recording device for recording, storing and retrieving information.

It has been known for some years that so-called "non-contacting" magnetic recording techniques (wherein there is no direct physical contact between a magnetic recording medium and the magnetic transducers associated therewith) must be used if certain types of information, as high frequency or wide-band signals, are to be satisfactorily processed. Among the types of magnetic recorders incorporating non-contacting recording techniques are those recorders which utilize a "pliant" recording disc.

An example of a pliant disc recorder is illustrated in U.S. Patent #2,950,353. In a recorder of the type described in the cited patent, a pliant recording disc (meaning a disc almost, if not completely, free of internal stresses or bending moments) is rotated in a fluid, as air, about a predetermined axis and in proximity with an annular plate. A combination of centrifugal forces and so-called "Bernoulli" forces produced by rotation of the disc cause the disc to reach a condition of equilibrium in which the periphery of the disc is closely spaced from the annular plate. Recording may then be accomplished if a magnetic transducer is disposed flush with the surface of the annular plate opposite the portion of the disc closely spaced therefrom.

In other types of recorders, as those illustrated and described in the pending U.S. applications for patent, Serial Nos. 853,373 and 25,995, filed November 16, 1959, now abandoned and May 2, 1960, now Patent No. 3,110,889 dated November 12, 1963, respectively, and assigned to the same assignee as this application, positioning of a flexible recording disc is attained when an equilibrium condition is reached between the centrifugal, fluid and elastic forces operating on a practical disc. Any desired equilibrium condition is reached in the former case by regulating the initial pressure of the fluid moving between the flexible disc and a stabilizing plate to balance the fixed stresses and bending moments in the particular flexible disc being used. In the latter case, the equilibrium condition is attained by regulating the fluid pressure gradient radially in the space between the flexible disc and the stabilizing plate, again to balance the fixed stresses and bending moments in the particular flexible disc being used. In either case, the result of regulation of the fluid pressure is that the cross-sectional shape of the disc is changed so that a sufficiently small separation between the stabilizing plate and at least half the area of the disc exists. Consequently, the efficiency of a flexible disc as a magnetic storage medium is very greatly increased.

Therefore, it is an object of this invention to provide an improved magnetic recorder which utilizes automatically controlled transducer-to-recording medium separation, the transducer being fixed in position and the recording medium being movable to attain the required spacing.

Another object of the invention is to provide an improved magnetic recorder utilizing a recording medium in the form of a flexible disc whose cross-sectional shape may be changed to vary the transducer-to-recording medium distance between points on the disc and a number of transducers disposed radially of the recording medium.

Another object of the invention is to provide an improved magnetic recorder in which high frequency signals may be stored on a flexible disc having a high volume-storage efficiency.

Another object of the invention is to provide an improved magnetic recorder utilizing a flexible disc in a fluid as a recording medium, the distribution of the fluid forces on the disc being adjustable so as to compensate for variations in the physical characteristics of the disc itself, the accuracy of positioning of each one of a plurality of magnetic transducers with respect to the disc, and changes in viscosity in the fluid.

These and other objects of the invention are attained generally in a magnetic recorder using a plurality of magnetic transducers by providing a membrane-like, or flexible, disc having a magnetizable surface, supporting the disc in proximity to an annular stabilizing plate in a fluid, as air, and rotating the disc rapidly to generate dynamic and fluid forces which, in combination with the elastic forces in the disc, cause the disc to tend to assume a desired position with respect to the stabilizing plate, and regulating the fluid forces acting on the side of the disc removed from the stabilizing plate, thereby forcing the disc to assume a desired cross-sectional shape so that the spacing between the disc and each one of a plurality of magnetic transducers embedded in the stabilizing plate is adjusted in accordance with the radial position of each such transducer with respect to the flexible disc.

Figure 2:
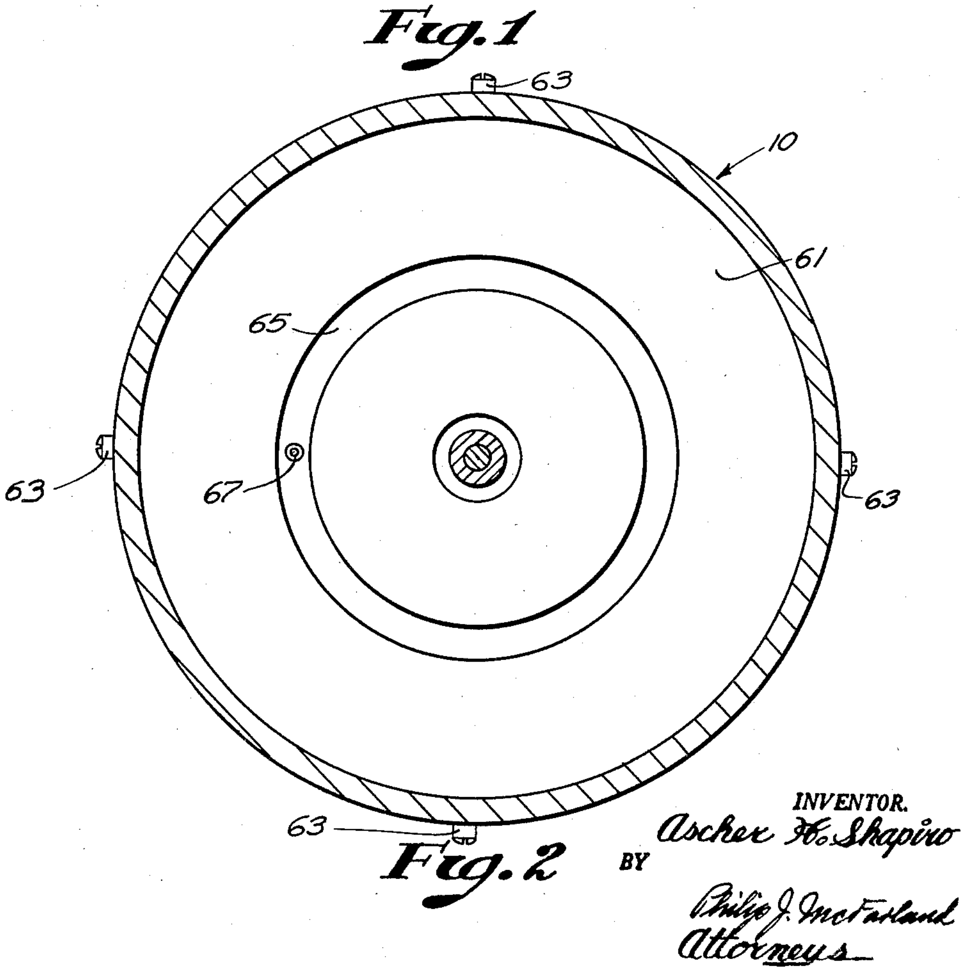

For a more complete understanding of the invention, reference is now made to the following detailed description of a preferred embodiment of the invention, illustrated in the accompanying drawings, in which:

FIG. 1 is a cross-sectional view of a magnetic recording device according to the invention, the figure being greatly simplified and somewhat distorted the better to illustrate the principles of the invention; and, FIG. 2 is a top view taken along the line 2—2 of FIG. 1 showing the construction of the adjusting plate used in FIG. 1.

Before describing the drawings in detail, it should be noted that for simplicity only one magnetic transducer is shown and further that the relative distances between the recording medium and the adjacent elements has been very greatly distorted.

The preferred embodiment of the invention comprises an enclosure 10 in and on which is mounted a recording medium support and driving assembly 12, a stabilizing plate and magnetic transducer supporting assembly 14, a pressure relating assembly 16 and a fluid adjusting assembly 18.

The enclosure 10 preferably consists of a closed symmetrically shaped container having appropriately shaped apertures formed at various points through its walls to accommodate elements described in more detail here and after. The disc supporting and rotating assembly 12 consists of an electric motor 21 (preferably a synchronous motor which may be energized from any convenient source not shown) through lead wires 23. Electric motor 21 is fastened, as by screws 25 to the top of the enclosure 10. The rotor shaft 27 of the electric motor is extended through a gland 28 in the top of enclosure 10, preferably being supported therein by ball bearings 29. A pair of opposing flanges 31, 33 in turn are affixed in any convenient manner to the shaft 27 so as to hold a flexible magnetizable disc 35 as illustrated. The stabilizing plate and magnetic transducer support assembly 14 consists of an annular plate 37 attached in any convenient manner to the walls of enclosure 10 to divide the space inside the enclosure 10 into separate compartments 38, 38A as shown. A plurality of magnetic transducers 39 (only one of these transducers being shown in the drawing) are mounted flush with a surface of the annular plate 37. For example, screws 40 may be used to attach the annular plate 37 to the enclosure 10. The annular plate 37 is also formed so as to accommodate a number of supporting posts 41, which elements in turn are threaded into, or otherwise affixed to, the bottom of the enclosure 10. The length of each one of the posts 41 is adjusted so as to hold the annular plate 37 perpendicular to the axis of the shaft 27 and to space the inner edge of the aperture in such plate at a short distance from the flange 33. To complete assembly 14, each one of the magnetic transducers 39 is connected, as by leads 43, to a socket 45 supported in one wall of the enclosure 10.

The initial pressure regulating assembly 16 consists of a cover plate 47 having a substantially U-shaped cross-section affixed in a convenient manner to the annular plate 37 so as to form an air tight connection in between those two elements. A needle valve 49 is screwed into an opening in the cover plate 47. Consequently, the cover plate 47, the annular plate 37, and the flange 33 define a manifold 51 having an inlet 53 and an annular outlet 55. Needle valve 49 is opened to the atmosphere within the enclosure 10 and the particular setting of the needle is controlled by pressure sensitive means 57 and temperature sensitive means 59 shown in block form. An opening 60 through a wall of the enclosure 10 communicating with the outside atmosphere completes the assembly 16.

In operation a fluid which, in the illustrated cases is air, is drawn in through the needle valve 49 into the manifold 51 through the inlet 53 and is thence moved through the outlet 55 when the electric motor 21 is energized to rotate the flexible disc 35, as described in more detail in the cited application, Serial No. 853,373.

The fluid adjustment assembly 18 consists of a shroud 61 supported within the enclosure 10 at a distance (in the order of four times the distance between the flexible disc 35 and the annular plate 37) above the flexible disc 35, as by screws 63. A circular groove 65 is formed in the shroud 61 on the side of the shroud facing the flexible disc 35. A pipe 67 is led through the shroud 61 to communicate with the circular groove 65. The second end of the pipe 67 is led through the top of the enclosure 10 to reversible air pump 69. A second pipe 71 is led from the pump 69 to the atmosphere outside the enclosure 10. Lead wires 73 (which may be connected to an auxiliary coil on a magnetic transducer 39 as shown or be connected to the working coil of the transducer in any known manner) are attached to the input of a servo amplifier 75. The output of the servo-amplifier 75 is led through lead wires 77 to the reversible air pump 69.

The fluid adjustment assembly 18 operates as follows:

After the electric motor 21 has been energized so that the flexible disc 35 assumes a position as for example that shown by the curve "A," the amplitude of the signal through the lead wires 73 into the servo-amplifier 75 may be compared to an amplitude of a reference signal into that same component. If the amplitude of the signal on lead wires 73 is less than the amplitude of the reference signal, servo-amplifier 75 generates a control signal to cause the reversible air pump 69 to pump air through pipe 67 into the enclosure 10. Consequently, the air pressure in the compartment 38 is increased. Such an increase causes the flexible disc 35 to assume a different cross-sectional shape, as, for example, shown by the curve "B," thereby increasing the amplitude of the signal through the lead wires 73 until the amplitude of such signal is the same as the amplitude of the reference signal. On the other hand, if the amplitude of the signal through the lead wires 73 is greater than the amplitude of the reference signal, servo-amplifier 75 generates a signal to reverse the direction of rotation of the reversible air pump 69 so as to remove air from the enclosure 10 through the pipe 67. Consequently, the pressure of the air in compartment 38 is reduced and the flexible disc 35 will, at equilibrium, assume a shape such as is shown by the curve "C."

It will become immediately apparent to those having skill in the art that many variations of the invention may be easily made without departing from the concepts of the invention. For example, if it be desired to adjust the cross-sectional shape of a rotating flexible disc by regulating the fluid pressure gradient on the side of a flexible disc removed from a stabilizing plate, then such a result may easily be accomplished simply by moving the shroud 61 closer to the flexible disc 35. That is, if instead of placing the shroud 61 at a much greater distance from the flexible disc than the annular plate 37 as illustrated, the shroud 61 is as closely spaced from the flexible disc 35 as the annular plate 37, it will be found that the effect of groove 65 on the flexible disc 35 would be the same as the grooves shown in application Serial No. 25,995, now U.S. Patent 3,110,889 mentioned hereinbefore. It is also evident that the pressure regulating assembly 16 is not essential to the operation of the invention. That is, final positioning of a flexible recording disc may be accomplished solely by varying the back pressure in the compartment 38. It is also evident that the particular size, or, for that matter, the number of grooves 65 is not critical.

In view of the foregoing obvious modifications to the invention and others not mentioned, it is intended that the invention not be limited by the scope of the illustrated embodiment thereof, but rather in accordance with the spirit and scope of the appended claims.

What is claimed is:

1. Apparatus for controlling the cross-sectional shape of a membrane rotating in a fluid, comprising, means for supporting the membrane centrally thereof and rotating the membrane, a stabilizing plate having a surface adjacent to a first surface of the membrane, means for establishing a first fluid pressure gradient in the channel defined by the first surface of the membrane and the surface of the stabilizing plate and radially of the membrane, a shroud having a surface adjacent to the second surface of the membrane and means for establishing a second fluid pressure gradient in the space defined by the second surface of the membrane and the surface of the shroud and radially of the membrane, the second fluid pressure gradient differing from the first fluid pressure gradient.

2. Apparatus as in claim 1 wherein the spacing between the membrane and the surface of the stabilizing plate is less than the distance between the membrane and the shroud.

3. Apparatus as in claim 2 wherein the fluid is a gas and the minimum pressure on the side of the membrane adjacent the shroud is greater than the maximum pressure on the side of the membrane adjacent the stabilizing plate.

4. A magnetic recorder utilizing a flexible recording disc and a plurality of magnetic transducers in a fluid, each one of the magnetic transducers being radially disposed with respect to the flexible recording disc and supported flush with a surface of a stabilizing plate, comprising, means for rotating the flexible recording disc to establish a first radial fluid pressure gradient in the space defined by the surface of the stabilizing plate and one surface of the flexible recording disc, annular shroud parallel to the surface of the stabilizing plate, and having a surface facing the second surface of the flexible recording disc and spaced therefrom and means operative through the annular shroud for establishing a second radial fluid pressure gradient in the space defined by the surface of the annular shroud and the second surface of the flexible recording disc.

5. A magnetic recorder as in claim 4 wherein the fluid pressure on each unit area of the second surface of the flexible recording disc is greater than fluid pressure on the corresponding unit area of the first surface thereof.

6. A magnetic recorder as in claim 4 wherein the fluid pressure on each unit area of the second surface of the flexible recording disc is less than the fluid pressure on the corresponding unit area of the first surface thereof.

7. A magnetic recorder in which a recording medium is moved in a fluid, comprising, a flexible recording disc, a stabilizing plate and an annular shroud parallel to each other and disposed on either side of the flexible recording disc, a plurality of magnetic transducers, each one supported by the stabilizing plate flush with the surface thereof adjacent to the flexible recording disc, means for rotating the disc in the space defined by the facing surfaces of the stabilizing plate and the annular shroud and means for regulating the radial fluid pressure gradient in the space defined by the annular shroud and one surface of the flexible recording disc to adjust the distance between each one of the plurality of magnetic transducers and the surface of the flexible recording disc.

References Cited by the Examiner

UNITED STATES PATENTS

| | | | |
|---|---|---|---|
| 2,950,353 | 8/60 | Fomenko | 179—100.2 |
| 3,063,039 | 11/62 | Taft | 340—174.1 |
| 3,110,889 | 11/63 | Morley et al. | 340—174.1 |

FOREIGN PATENTS

| | | |
|---|---|---|
| 758,865 | 10/56 | Great Britain. |
| 850,766 | 10/60 | Great Britain. |

IRVING L. SRAGOW, *Primary Examiner.*

E. JAMES SAX, *Examiner.*